United States Patent
Liu et al.

(10) Patent No.: US 10,742,456 B2
(45) Date of Patent: Aug. 11, 2020

(54) SIGNAL MODULATION METHOD AND DEVICE

(71) Applicant: Shenzhen Super Data Link Technology Ltd., Longgang Dist Shenzhen, Guangdong (CN)

(72) Inventors: Ruopeng Liu, Guangdong (CN); Chunlin Ji, Guangdong (CN); Changwei Lv, Guangdong (CN); Shasha Zhang, Guangdong (CN)

(73) Assignee: SHEN ZHEN KUANG-CHI HEZHONG TECHNOLOGY LTD, Shenzhen (CN)

( * ) Notice: Subject to any disclaimer, the term of this patent is extended or adjusted under 35 U.S.C. 154(b) by 0 days.

(21) Appl. No.: 16/256,894

(22) Filed: Jan. 24, 2019

(65) Prior Publication Data
US 2019/0158323 A1   May 23, 2019

Related U.S. Application Data (63) Continuation of application No. PCT/CN2017/091958, filed on Jul. 6, 2017.

(30) Foreign Application Priority Data

Jul. 25, 2016   (CN) .......................... 2016 1 0588938

(51) Int. Cl.
*H04L 25/03*   (2006.01)
*H04L 25/49*   (2006.01)

(52) U.S. Cl.
CPC ........ *H04L 25/03261* (2013.01); *H04L 25/03* (2013.01); *H04L 25/03012* (2013.01);
(Continued)

(58) Field of Classification Search
CPC ............... H04L 25/03261; H04L 25/03; H04L 25/0384; H04L 25/03159; H04L 27/00;
(Continued)

(56) References Cited

U.S. PATENT DOCUMENTS 8,917,786 B1   12/2014   Von Der Embse
2012/0163489 A1*   6/2012   Ramakrishnan ..........................
H04L 25/03834
375/279

(Continued)

FOREIGN PATENT DOCUMENTS

CN   1641376 A   7/2005
CN   104883205 A   9/2015
(Continued)

OTHER PUBLICATIONS

European Search Report for corresponding application EP17833411; dated Jan. 14, 2020.
(Continued)

Primary Examiner — Vineeta S Panwalkar
(74) Attorney, Agent, or Firm — Cantor Colburn LLP (57) ABSTRACT

The present invention provides a signal modulation method. The method includes: generating a transmit signal pulse waveform, where a width of the pulse waveform is $\tau$, each pulse waveform is associated with n symbols (n>1), a width of each symbol is $\Delta\tau$, and $$\Delta\tau = \frac{\tau}{n};$$

performing an operation on every n consecutive symbols in a to-be-sent symbol flow and the pulse waveform according to a preset operation manner, to generate an associated signal
(Continued)

S101 Generate a pulse waveform of a transmit signal, where a width of the pulse waveform is $\tau$ S102 Perform an operation on every n consecutive symbols in a to-be-sent symbol flow and the pulse waveform according to a preset operation manner, to generate an associated signal of the symbols and the pulse waveform S103 Send the associated signal by using a transmission channel of the symbols and the pulse waveform; and sending the associated signal by using a transmission channel. The present invention helps improve spectral efficiency of a system. In addition, symbols are mutually constrained based on a correlation between the symbols, and information symbols are scattered to a plurality of symbols, thereby helping improve a capability of resisting noise and attenuation by a signal.

8 Claims, 4 Drawing Sheets

(52) U.S. Cl.
CPC .... *H04L 25/0384* (2013.01); *H04L 25/03159* (2013.01); *H04L 25/03343* (2013.01); *H04L 25/03834* (2013.01); *H04L 25/4902* (2013.01)

(58) Field of Classification Search
CPC ......... H04L 25/03343; H04L 25/03012; H04L 25/03834; H04L 25/4902
See application file for complete search history.

(56) References Cited

U.S. PATENT DOCUMENTS

2013/0215990 A1  8/2013  Larionov et al.
2015/0280944 A1* 10/2015  Li ...................... H04L 25/0384
                                                              375/295

FOREIGN PATENT DOCUMENTS

| CN | 105493460 A | 4/2016 |
| WO | 2013159207 A1 | 10/2013 |
| WO | 2015086136 A1 | 6/2015 |

OTHER PUBLICATIONS

Marwa El Hefnawy, "Overview of Faster-Than-Nyquist for future Mobile Communication Systems", DOCOMO Communications Laboratories European GmBH, IEEE, Jun. 2, 2013, XP032547918.

* cited by examiner

SIGNAL MODULATION METHOD AND DEVICE

CROSS-REFERENCE TO RELATED APPLICATIONS

This application is a continuation of International Application No. PCT/CN2017/091958, filed Jul. 6, 2017, which claims priority to Chinese Patent Application No. 201610588938.9, filed Jul. 25, 2016, each of which is incorporated by reference herein in its entirety.

TECHNICAL FIELD

The present invention relates to the communications field, and in particular, to a signal modulation method and device.

BACKGROUND

In a communications system, intercode (or intersymbol) interference (Intersymbol Interference, ISI) is a key factor that affects system performance. To avoid the intercode interference, in the communications field, the Nyquist criterion that can avoid the ISI is proposed, and a raised cosine filter satisfying the Nyquist criterion is proposed. Currently, the Nyquist criterion for ISI-free transmission becomes a guideline for communications system design.

The Nyquist criterion can effectively avoid the ISI intercode interference and reduce detection complexity. However, in a Nyquist system, to satisfy the Nyquist criterion, excessive bandwidth inevitably needs to be introduced, thereby reducing spectral efficiency. In addition, in a current commonly used communications modulation method, there is no ISI intercode interference when each symbol is independently sent, but there is also no coding constraint relationship between transmitted symbols, thereby mitigating a capability of resisting noise and attenuation by a signal.

SUMMARY

An objective of the present invention is to provide a signal modulation method and device, to resolve a prior-art problem that excessive bandwidth is easily introduced in a signal modulation method, thereby reducing spectral efficiency and mitigating a capability of resisting noise and attenuation by a signal.

According to a first aspect, an embodiment of the present invention provides a signal modulation method. The method includes:

generating a transmit signal pulse waveform, where a width of the pulse waveform is $\tau$, each pulse waveform is associated with n symbols (n>1), a width of each symbol is $\Delta\tau$, and $$\Delta\tau = \frac{\tau}{n};$$

and performing an operation on every n consecutive symbols in a to-be-sent symbol flow and the pulse waveform according to a preset operation manner, to generate an associated signal of the symbols and the pulse waveform.

With reference to the first aspect, in a first possible implementation of the first aspect, the preset operation manner is a convolution operation, and the step of performing an operation on every n consecutive symbols in a to-be-sent symbol flow and the pulse waveform according to a preset operation manner, to generate an associated signal of the symbols and the pulse waveform includes:

obtaining, based on a convolution expression $S_i \times h_0 + S_{i-1} \times h_1 + \ldots + S_{i-n+1} \times h_{n-1}$, the associated signal generated by using the every n consecutive symbols in the to-be-sent symbol flow and the pulse waveform, where $S_i$ indicates an $i^{th}$ symbol, i is an integer, h is a pulse waveform function and may be expressed as $h=[h_0, h_1, \ldots, h_{n-1}]$, n indicates a quantity of associated symbols, and a spacing of each symbol is $\Delta\tau$.

With reference to the first aspect, in a second possible implementation of the first aspect, the preset operation manner is a multiplication operation, and the step of performing an operation on every n consecutive symbols in a to-be-sent symbol flow and the pulse waveform according to a preset operation manner, to generate an associated signal of the symbols and the pulse waveform includes:

obtaining, based on a multiplication expression $S_i^{h_0} \times S_{i-1}^{h_1} \ldots \times S_{i-n+1}^{h_{n-1}}$, the associated signal generated by using the every n consecutive symbols in the to-be-sent symbol flow and the pulse waveform, where $S_i$ indicates an $i^{th}$ symbol, h is a pulse waveform function and may be expressed as $h=h_0, h_1, \ldots, h_{n-1}]$, and n indicates a quantity of associated symbols.

With reference to the second possible implementation of the first aspect, in a third possible implementation of the first aspect, the symbol $S_i$ is expressed as $Ae^{j(wt+\theta_i)}$, where A indicates an amplitude, w indicates an angular frequency, t indicates a time, and $\theta_i$ indicates a phase; and the associated signal generated by using the every n consecutive symbols in the symbol flow and the pulse waveform is $A'e^{j((h_0+h_1+\ldots+h_{n-1})wt+h_0\theta_i+h_1\theta_{i-1}+\ldots h_{n-1}\theta_{i-n+1})}$, where A' indicates an amplitude of the associated signal.

With reference to the first aspect, in a fourth possible implementation of the first aspect, the preset operation manner includes an addition operation, a subtraction operation, a multiplication operation, or an operation of a preset function relationship.

According to a second aspect, an embodiment of the present invention provides a signal modulation device. The device includes:

a pulse waveform generation unit, configured to generate a transmit signal pulse waveform, where a width of the pulse waveform is $\tau$, each pulse waveform is associated with n symbols (n>1), a width of each symbol is $\Delta\tau$, and $$\Delta\tau = \frac{\tau}{n};$$

and an operation unit, configured to perform an operation on every n consecutive symbols in a to-be-sent symbol flow and the pulse waveform according to a preset operation manner, to generate an associated signal of the symbols and the pulse waveform.

With reference to the second aspect, in a first possible implementation of the second aspect, the preset operation manner is a convolution operation, and the operation unit is specifically configured to:

obtain, based on a convolution expression $S_i \times h_0 + S_{i-1} \times h_1 \ldots + S_{i-n+1} \times h_{n-1}$, the associated signal generated by using the every n consecutive symbols in the to-be-sent symbol flow and the pulse waveform, where $S_i$ indicates an $i^{th}$ symbol, h is a pulse waveform function and may be expressed as h=[$h_0, h_1, \ldots, h_{n-1}$], and n indicates a quantity of associated symbols.

With reference to the second aspect, in a second possible implementation of the second aspect, the preset operation manner is a multiplication operation, and the operation unit is specifically configured to:

obtain, based on a multiplication expression $S_i^{h_0} \times S_{i-1}^{h_1} \ldots \times S_{i-n+1}^{h_{n-1}}$, the associated signal generated by using the every n consecutive symbols in the to-be-sent symbol flow and the pulse waveform, where $S_i$ indicates an $i^{th}$ symbol, h is a pulse waveform function and may be expressed as h=[$h_0, h_1, \ldots, h_{n-1}$], and n indicates a quantity of associated symbols.

With reference to the second possible implementation of the second aspect, in a third possible implementation of the second aspect, the symbol S is expressed as $Ae^{j(wt+\theta_i)}$, where A indicates an amplitude, w indicates an angular frequency, and $\theta_i$ indicates a phase; and the associated signal generated by using the every n consecutive symbols in the symbol flow and the pulse waveform is $A'e^{j((h_0+h_1+\ldots+h_{n-1})wt+h_0\theta_i+h_1\theta_{i-1}+\ldots h_{n-1}\theta_{i-n+1})}$, where A' indicates an amplitude of the associated signal.

With reference to the second aspect, in a fourth possible implementation of the second aspect, the preset operation manner includes an addition operation, a subtraction operation, a multiplication operation, or an operation of a preset function relationship.

In the present invention, the pulse waveform including widths of n symbols is generated, and the operation is performed on the pulse waveform and the n consecutive symbols according to the preset operation manner, so that in the generated associated signal, a symbol in the width of each symbol includes information about the n symbols, and more symbols are transmitted in duration of the width of each symbol. This helps improve spectral efficiency of a system. In addition, symbols are mutually constrained based on a correlation between the symbols, and information symbols are scattered to a plurality of symbols, thereby helping improve a capability of resisting noise and attenuation by a signal.

DESCRIPTION OF EMBODIMENTS

To make the objectives, technical solutions, and advantages of the present invention clearer, the following further describes the present invention in detail with reference to the accompanying drawings and the embodiments. It should be understood that the specific embodiments described herein are merely used to explain the present invention, but not to limit the present invention.

An objective of the embodiments of the present invention is to provide a signal modulation method, to resolve a prior-art problem that the Nyquist criterion is usually used, in combination with a raised cosine filter satisfying the Nyquist criterion, to improve accuracy of system transmission and avoid impact of intercode interference on the system transmission. When the Nyquist criterion is used, in combination with the raised cosine filter satisfying the Nyquist criterion, the intercode interference ISI can be effectively avoided, and detection complexity can be reduced. However, the following problems still exist when the criterion is used:

First, spectral efficiency is mitigated in a Nyquist system. This is a biggest disadvantage of the Nyquist system. For any physically implementable pulse waveform, to satisfy the Nyquist criterion, excessive bandwidth inevitably needs to be introduced, thereby reducing spectral efficiency.

Second, a design objective of the Nyquist system is to avoid the intercode interference ISI. Although the detection complexity is effectively reduced, symbols are independently sent, and the symbols are not associated with each other, thereby mitigating a capability of resisting noise and attenuation by a signal.

To resolve the foregoing problems and fully utilize spectrum resources for transmission, the present invention provides a modulation scheme applied to all communications systems. Coding and modulation are combined. A mutual constraint is formed between symbols by using any implementable mathematical model, including addition, subtraction, multiplication, or another function model, so that a formed communications system has effects such as a high symbol transmission rate, low system bandwidth, and high spectral efficiency. In addition, because of an inherent coding constraint relationship between symbols, a capability of resisting noise and attenuation by a signal is improved. The following provides detailed descriptions with reference to the accompanying drawings.

Figure 1:
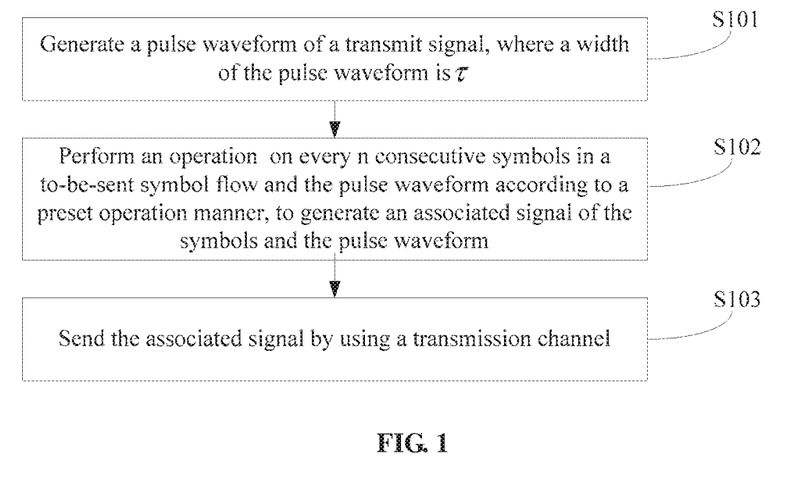
FIG. 1 is an implementation flowchart of a signal modulation method according to an embodiment of the present invention.

FIG. 1 is a schematic implementation flowchart of a signal modulation method according to an embodiment of the present invention. Details are as follows:

In step S101, a transmit signal pulse waveform is generated, where a width of the pulse waveform is τ, each pulse waveform is associated with n symbols (n>1), a width of each symbol is Δτ, and $$\Delta\tau = \frac{\tau}{n}.$$

The modulation method in this embodiment of the present invention may be applied to any domain, such as time domain, frequency domain, or coding domain.

Figure 2:
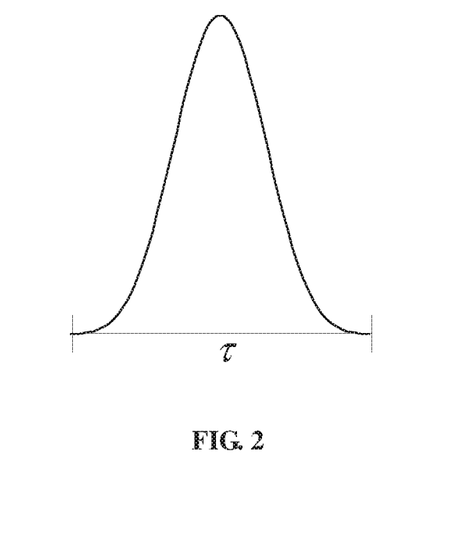
FIG. 2 is a schematic diagram of a pulse waveform according to an embodiment of the present invention.

Specifically, FIG. 2 is a schematic diagram of the pulse waveform in this embodiment of the present invention. As shown in FIG. 2, the width of the pulse waveform h(t) is τ, each pulse waveform is associated with n symbols (n>1), the width of each symbol is Δτ, and $$\Delta \tau = \frac{\tau}{n}.$$

Figure 3:
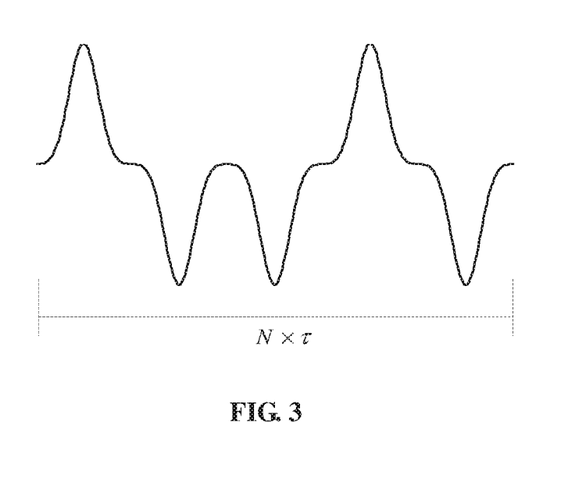
FIG. 3 is a schematic diagram of an ISI-free signal waveform obtained after modulation in the prior art.

In a conventional modulation scheme, n is 1, only one symbol can be sent in one pulse waveform, and consecutive independent symbols are sent in a transmission channel. FIG. 3 is a schematic diagram of an ISI-free signal waveform obtained after modulation in the prior art. N indicates a quantity of symbols included in a data frame. In the prior art, in a waveform modulation process, excessive bandwidth inevitably needs to be introduced to satisfy the Nyquist criterion.

To avoid excessive bandwidth, in this embodiment of the present invention, the transmit signal pulse waveform is generated, and the width of the pulse is a sum of widths of a plurality of symbols. A quantity of symbols may be flexibly selected according to a modulation requirement of a user. When the selected quantity n of symbols is larger, more symbols are sent in a same pulse waveform, spectral efficiency is higher, and there are more associated symbols in a same symbol width.

In step S102, an operation is performed on every n consecutive symbols in a to-be-sent symbol flow and the pulse waveform according to a preset operation manner, to generate an associated signal of the symbols and the pulse waveform.

In this embodiment of the present invention, the preset operation manner may include a manner of a convolution operation, an addition operation, a subtraction operation, a multiplication operation, or another function operation.

The every n consecutive symbols in the to-be-sent symbol flow specifically mean: In the to-be-sent symbol flow, modulation and coding are performed from a first location in the symbol flow, a first to an $n^{th}$ symbols in the symbol flow are selected, and modulation is performed on the symbols and a pulse waveform; then a second to an $(n+1)^{th}$ symbols are selected, and a modulation association operation is performed on the symbols and a pulse waveform; and so on, until a last symbol of the data frame is reached.

The n consecutive symbols are selected, and modulation is performed on the symbols and the pulse waveform, so that a receive end obtains consecutive symbol flow data when demodulating the signal.

A difference from the prior art lies in: In the present invention, after the pulse waveform including widths of n symbols is selected, the every n consecutive symbols are correspondingly selected, and a modulation operation is performed on the symbols and the pulse waveform, to obtain the associated signal including information about the n symbols.

For all symbol data in the symbol flow, modulation on all the symbol data in the symbol flow can be completed provided that modulation is performed on every n symbols and one pulse waveform based on numbers of symbols in the symbol flow.

In a preferred implementation, the method further includes step S103: Send the associated signal by using a transmission channel.

After the modulation is performed on the n consecutive symbols in the symbol flow and the pulse waveform, the associated signal generated by using the n symbols and the pulse waveform is obtained. A consecutive associated signal corresponding to the to-be-sent symbol flow may be obtained after continuous modulation is performed on the to-be-sent symbol flow. The associated signal is sent to the receive end. The receive end can obtain sent symbol data by demodulating an associated signal of each pulse waveform.

In the present invention, to-be-sent symbols are scattered to a plurality of symbols (symbols in a same pulse waveform) by using a preset operation model, and an association and constraint relationship is generated between these symbols, thereby helping improve a capability of resisting noise and attenuation by a signal. In addition, a plurality of symbols may be sent in a same pulse waveform, thereby helping improve spectrum utilization.

Embodiment 1

Figure 4:
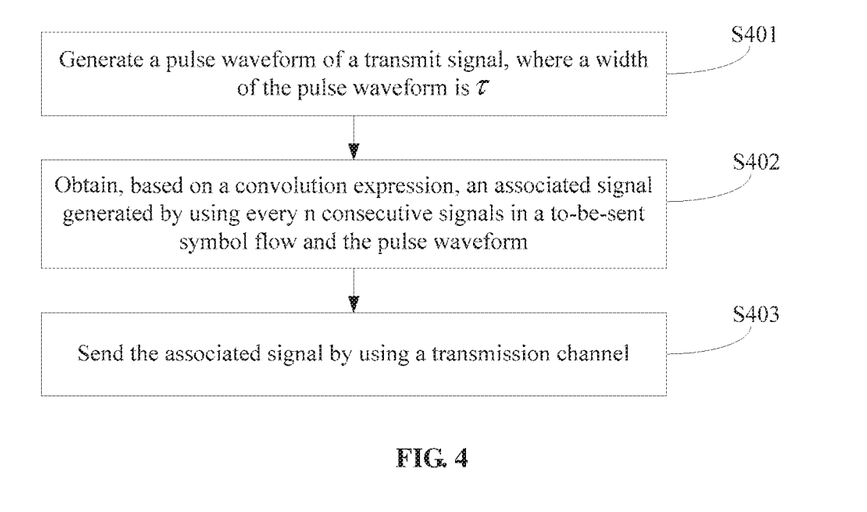
FIG. 4 is an implementation flowchart of a signal modulation method according to a first embodiment of the present invention.

FIG. 4 shows an implementation procedure of a method for performing signal modulation by using a convolution operation model according to a first embodiment of the present invention. Details are as follows:

In step S401, a transmit signal pulse waveform is generated, where a width of the pulse waveform is τ, each pulse waveform is associated with n symbols (n>1), a width of each symbol is Δτ, and $$\Delta \tau = \frac{\tau}{n}.$$

The pulse waveform is shown in FIG. 2.

In step S402, an associated signal generated by using every n consecutive symbols in a to-be-sent symbol flow and the pulse waveform is obtained based on a convolution expression $S_i \times h_0 + S_{i-1} \times h_1 \ldots + S_{i-n+1} \times h_{n-1}$, where $S_i$ indicates an $i^{th}$ symbol, h is a pulse waveform function and may be expressed as $h=[h_0, h_1, \ldots, h_{n-1}]$, n indicates a quantity of associated symbols, and a spacing of each symbol is Δτ.

Figure 5:
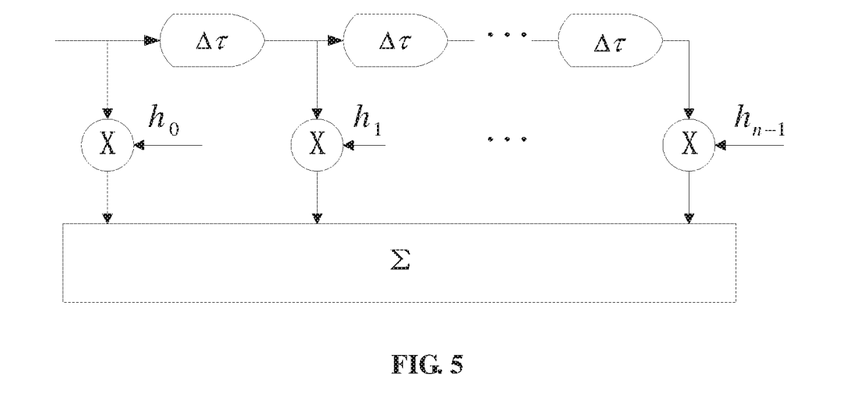
FIG. 5 is a schematic model diagram of a convolution operation according to a first embodiment of the present invention.

A convolution operation is performed on the to-be-sent symbol flow S and the pulse waveform h. A convolution operation model is shown in FIG. 5. A process of performing convolution on the every n consecutive symbols and the pulse waveform may be expressed as:

$S_i \times h_0 + S_{i-1} \times h_1 \ldots + S_{i-n+1} \times h_{n-1}$, that is, each symbol is multiplied by a different coefficient by using an addition operation, and a correlation between the symbols is implemented through addition of the symbols, thereby truly completing convolution between the symbols.

In step S403, the associated signal is sent by using a transmission channel.

Figure 6:
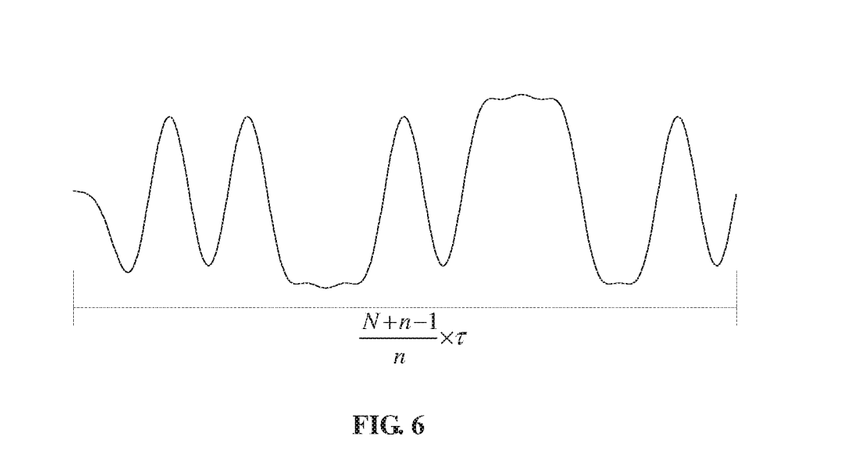
FIG. 6 is a diagram of a signal waveform after a convolution operation is performed according to a first embodiment of the present invention.

A diagram of a signal waveform obtained after the convolution operation is performed is shown in FIG. 6. N indicates a quantity of symbols included in a data frame. The width $$\frac{\tau}{n}$$

of each symbol actually includes information about the n symbols, that is, a correlation between the symbols is implemented. In addition, because more symbols are transmitted in the width of each symbol, a transmission rate of an entire system increases. Association between symbols does not help extend system bandwidth. In addition, compared with that in a Nyquist transmission system, in this embodiment of the present invention, excessive bandwidth is caused due to the association between symbols, and system bandwidth is related only to bandwidth of a pulse waveform. Moreover, from a perspective of coding, an essence of coding is symbol scattering. A mutual constraint relationship is generated based on a correlation between symbols, and information symbols are scattered to a plurality of codeword symbols, thereby helping improve a capability of resisting noise and attenuation by a signal.

Embodiment 2

Figure 7:
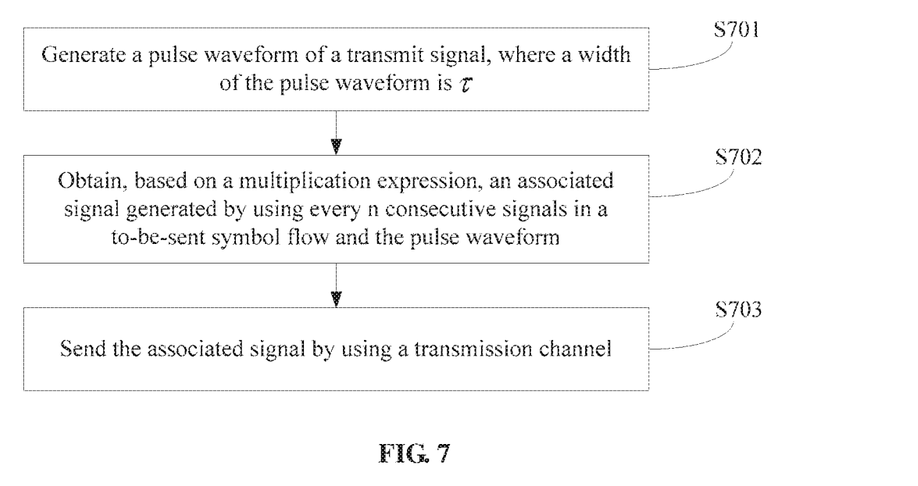
FIG. 7 is an implementation flowchart of a signal modulation method according to a second embodiment of the present invention.

FIG. 7 shows an implementation procedure of a method for performing signal modulation by using a multiplication operation model according to a second embodiment of the present invention. Details are as follows:

In step S701, a transmit signal pulse waveform is generated, where a width of the pulse waveform is $\tau$, each pulse waveform is associated with n symbols (n is an integer greater than 1), a width of each symbol is $\Delta\tau$, and $$\Delta\tau = \frac{\tau}{n}.$$

In step S702, an associated signal generated by using every n consecutive symbols in a to-be-sent symbol flow and the pulse waveform is obtained based on a multiplication expression $S_i^{h_0} \times S_{i-1}^{h_1} \ldots \times S_{i-n+1}^{h_{n-1}}$, where $S_i$ indicates an $i^{th}$ symbol, h is a pulse waveform function and may be expressed as $h=[h_0, h_1, \ldots, h_{n-1}]$, and a spacing of each symbol is $\Delta\tau$.

Figure 8:
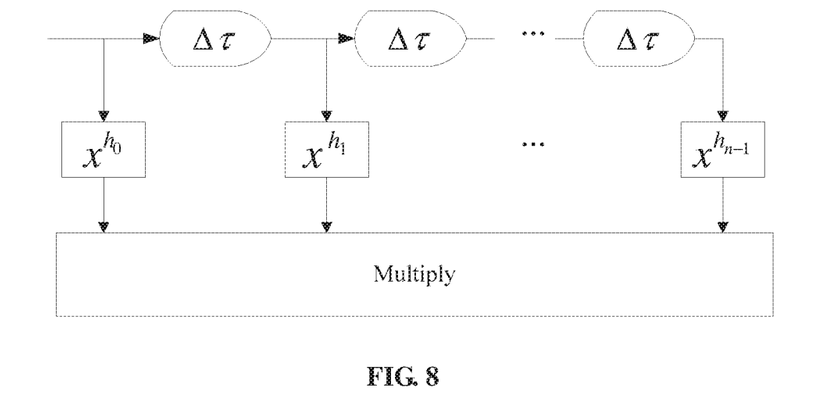
FIG. 8 is a model diagram of a multiplication operation according to a second embodiment of the present invention.

A multiplication operation is performed on the to-be-sent symbol flow S and the pulse waveform h. A multiplication operation model is shown in FIG. 8. A process of multiplying the every n consecutive symbols by the pulse waveform may be expressed as:

$S_i^{h_0} \times S_{i-1}^{h_1} \ldots \times S_{i-n+1}^{h_{n-1}}$. Assuming that each symbol may be expressed as $Ae^{j(wt+\theta_i)}$, where A indicates an amplitude, w indicates an angular frequency, and $\theta_i$ indicates a phase, a result obtained after the symbols are multiplied is expressed as $A'e^{j((h_0+h_1+\ldots+h_{n-1})wt+h_0\theta_i+h_1\theta_{i-1}+\ldots h_{n-1}\theta_{i-n+1})}$, where A' indicates an amplitude of the associated signal. That is, by using the multiplication operation, a correlation between the symbols is implemented, and a phase-domain correlation is also implemented.

In step S703, the associated signal is sent by using a transmission channel.

A width $$\frac{\tau}{n}$$

of each symbol obtained after the multiplication operation is performed actually includes information about the n symbols, and a correlation between the symbols is implemented. In addition, because more symbols are transmitted in the width $$\frac{\tau}{n}$$

of each symbol, a transmission rate of an entire system increases. Moreover, from a perspective of coding, an essence of coding is symbol scattering. A mutual constraint relationship is generated based on a correlation between symbols, and information symbols are scattered to a plurality of codeword symbols, thereby helping improve a capability of resisting noise and attenuation by a signal.

Embodiment 3

Figure 9:
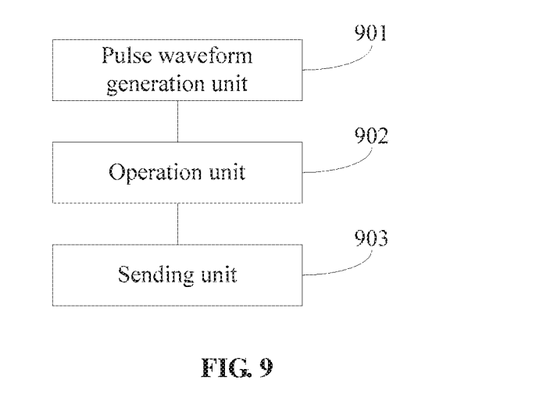
FIG. 9 is a schematic structural diagram of a signal modulation device according to a third embodiment of the present invention.

FIG. 9 is a schematic structural diagram of a signal modulation device according to a third embodiment of the present invention. Details are as follows:

The signal modulation device in this embodiment of the present invention includes:

a pulse waveform generation unit 901, configured to generate a transmit signal pulse waveform, where a width of the pulse waveform is $\tau$, each pulse waveform is associated with n symbols (n>1), a width of each symbol is $\Delta\tau$, and $$\Delta\tau = \frac{\tau}{n};$$

an operation unit 902, configured to perform an operation on every n consecutive symbols in a to-be-sent symbol flow and the pulse waveform according to a preset operation manner, to generate an associated signal of the symbols and the pulse waveform; and a sending unit 903, configured to send the associated signal by using a transmission channel.

Preferably, the preset operation manner is a convolution operation, and the operation unit is specifically configured to:

obtain, based on a convolution expression $S_i \times h_0 + S_{i-1} \times h_1 \ldots + S_{i-n+1} \times h_{n-1}$, the associated signal generated by using the every n consecutive symbols in the to-be-sent symbol flow and the pulse waveform, where $S_i$ indicates an $i^{th}$ symbol, h is a pulse waveform function and may be expressed as $h=[h_0, h_1, \ldots, h_{n-1}]$, n indicates a quantity of associated symbols, and a spacing of each symbol is $\Delta\tau$.

Preferably, the preset operation manner is a multiplication operation, and the operation unit is specifically configured to:

obtain, based on a multiplication expression $S_i^{h_0} \times S_{i-1}^{h_1} \ldots \times S_{i-n+1}^{h_{n-1}}$, the associated signal generated by using the every n consecutive symbols in the to-be-sent symbol flow and the pulse waveform, where $S_i$ indicates an $i^{th}$ symbol, h is a pulse waveform function and may be expressed as $h=[h_0, h_1, \ldots, h_{n-1}]$, n indicates a quantity of associated symbols, and a spacing of each symbol is $\Delta\tau$.

Preferably, the symbol $S_i$ is expressed as $Ae^{j(wt+\theta_i)}$, where A indicates an amplitude, w indicates an angular frequency, and $\theta_i$ indicates a phase. The associated signal generated by using the every n consecutive symbols in the symbol flow and the pulse waveform is $A'e^{j((h_0+h_1+\ldots+h_{n-1})wt+h_0\theta_i+h_1\theta_{i-1}+\ldots h_{n-1}\theta_{i-n+1})}$, where A' indicates an amplitude of the associated signal.

Preferably, the preset operation manner includes an addition operation, a subtraction operation, a multiplication operation, or an operation of a preset function relationship.

The signal modulation device in this embodiment of the present invention is corresponding to the foregoing signal modulation method. Descriptions are not repeatedly provided herein.

In the several embodiments provided in the present invention, it should be understood that the disclosed device and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the devices or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing are merely preferred embodiments of the present invention, but are not intended to limit the present invention. Any modification, equivalent replacement, or improvement made within the spirit and principle of the present invention shall fall within the protection scope of the present invention.

What is claimed is:

1. A signal modulation method, wherein the method comprises:
   generating a transmit signal pulse waveform, wherein a width of the pulse waveform is $\tau$, each pulse waveform is associated with n symbols, n>1, a width of each symbol is $\Delta\tau$, and $$\Delta\tau = \frac{\tau}{n};$$

and
   performing an operation on every n consecutive symbols in a to-be-sent symbol flow and the pulse waveform according to a preset operation manner, to generate an associated signal of the symbols and the pulse waveform;
   wherein the preset operation manner is a convolution operation, and the step of performing an operation on every n consecutive symbols in a to-be-sent symbol flow and the pulse waveform according to a preset operation manner, to generate an associated signal of the symbols and the pulse waveform comprises:
   obtaining, based on a convolution expression $S_i \times h_0 + S_{i-1} \times h_1 \ldots + S_{i-n+1} \times h_{n-1}$, the associated signal generated by using the every n consecutive symbols in the to-be-sent symbol flow and the pulse waveform, wherein $S_i$ indicates an $i^{th}$ symbol, i is an integer, h is a pulse waveform function, and $h=[h_0, h_1, \ldots, h_{n-1}]$.

2. The method according to claim 1, wherein the preset operation manner is a multiplication operation, and the step of performing an operation on every n consecutive symbols in a to-be-sent symbol flow and the pulse waveform according to a preset operation manner, to generate an associated signal of the symbols and the pulse waveform comprises:
   obtaining, based on a multiplication expression $S_i^{h_0} \times S_{i-1}^{h_1} \ldots \times S_{i-n+1}^{h_{n-1}}$, the associated signal generated by using the every n consecutive symbols in the to-be-sent symbol flow and the pulse waveform, wherein $S_i$ indicates an $i^{th}$ symbol, i is an integer, h is a pulse waveform function, $h=[h_0, h_1, \ldots, h_{n-1}]$, and n indicates a quantity of associated symbols.

3. The method according to claim 2, wherein the symbol $S_i$ is expressed as $Ae^{j(wt+\theta_i)}$, wherein A indicates an amplitude, w indicates an angular frequency, t indicates a time, and $\theta_i$ indicates a phase; and the associated signal generated by using the every n consecutive symbols in the symbol flow and the pulse waveform is $A'e^{j((h_0+h_1+\ldots+h_{n-1})wt+h_0\theta_i+h_1\theta_{i-1}+\ldots h_{n-1}\theta_{i-n+1})}$, wherein A' indicates an amplitude of the associated signal.

4. The method according to claim 1, wherein the preset operation manner comprises an addition operation, a subtraction operation, a multiplication operation, or an operation of a preset function relationship.

5. A signal modulation device, wherein the device comprises:
   a pulse waveform generation unit, configured to generate a transmit signal pulse waveform, wherein a width of the pulse waveform is $\tau$, each pulse waveform is associated with n symbols, n>1, a width of each symbol is $\Delta\tau$, and $$\Delta\tau = \frac{\tau}{n};$$

and
   an operation unit, configured to perform an operation on every n consecutive symbols in a to-be-sent symbol flow and the pulse waveform according to a preset operation manner, to generate an associated signal of the symbols and the pulse waveform;

wherein the preset operation manner is a convolution operation, and the operation unit is configured to:

obtain, based on a convolution expression $S_i \times h_0 + S_{i-1} \times h_1 \ldots + S_{i-n+1} \times h_{n-1}$, the associated signal generated by using the every n consecutive symbols in the to-be-sent symbol flow and the pulse waveform, wherein $S_i$ indicates an $i^{th}$ symbol, i is an integer, h is a pulse waveform function, and $h=[h_0, h_1, \ldots, h_{n-1}]$.

6. The device according to claim 5, wherein the preset operation manner is a multiplication operation, and the operation unit is specifically configured to:

obtain, based on a multiplication expression $S_i^{h_0} \times S_{i-1}^{h_1} \ldots \times S_{i-n+1}^{h_{n-1}}$, the associated signal generated by using the every n consecutive symbols in the to-be-sent symbol flow and the pulse waveform, wherein $S_i$ indicates an $i^{th}$ symbol, i is an integer, h is a pulse waveform function, and $h=[h_0, h_1, \ldots, h_{n-1}]$.

7. The device according to claim 6, wherein the symbol $S_i$ is expressed as $Ae^{j(wt+\theta_i)}$, wherein A indicates an amplitude, w indicates an angular frequency, t indicates a time, and $\theta_i$ indicates a phase; and the associated signal generated by using the every n consecutive symbols in the symbol flow and the pulse waveform is $A'e^{j((h_0+h_1+\ldots+h_{n-1})wt+h_0\theta_i+h_1\theta_{i-1}+\ldots h_{n-1}\theta_{i-n+1})}$, wherein A' indicates an amplitude of the associated signal.

8. The device according to claim 5, wherein the preset operation manner comprises an addition operation, a subtraction operation, a multiplication operation, or an operation of a preset function relationship.

\* \* \* \* \*